United States Patent [19]

Friedmann et al.

[11] Patent Number: 4,889,009
[45] Date of Patent: Dec. 26, 1989

[54] TORQUE TRANSMITTING MECHANISM

[75] Inventors: Oswald Friedmann, Lichtenau; Hans-Dieter Elison, Offenburg, both of Fed. Rep. of Germany

[73] Assignee: LUK Lamellen und Kupplungsbau GmbH, Bühl, Fed. Rep. of Germany

[21] Appl. No.: 943,676

[22] Filed: Dec. 18, 1986

[30] Foreign Application Priority Data

Dec. 19, 1985 [DE] Fed. Rep. of Germany ....... 3544949
Dec. 21, 1985 [DE] Fed. Rep. of Germany ....... 3545724

[51] Int. Cl.$^4$ ............................................. F16F 15/10
[52] U.S. Cl. ..................................... 74/574; 192/48.3; 192/3.31; 74/572
[58] Field of Search ............... 74/574, 572; 192/56 R, 192/70.17, 70.23, 70.27, 48.3, 105 B, 65, 3.31

[56] References Cited

U.S. PATENT DOCUMENTS

| | | | |
|---|---|---|---|
| 2,203,117 | 6/1940 | Whatmoug | 192/105 B |
| 4,206,824 | 6/1980 | Klink | 192/3.31 |
| 4,305,493 | 12/1981 | Silberschlag | 192/3.31 |
| 4,468,207 | 8/1984 | Yoshida | 74/574 |
| 4,645,049 | 2/1987 | Matsuda et al. | 192/48.3 |
| 4,662,239 | 5/1987 | Worner et al. | 74/574 |
| 4,681,199 | 7/1987 | Maucher et al. | 192/48.3 |
| 4,696,384 | 9/1987 | Huber | 192/70.27 |

FOREIGN PATENT DOCUMENTS

| | | | |
|---|---|---|---|
| 3447926 | 11/1985 | Fed. Rep. of Germany | 74/574 |
| 3528175 | 2/1987 | Fed. Rep. of Germany | 74/574 |
| 2168780 | 6/1986 | United Kingdom | 74/574 |

Primary Examiner—Vinh Luong
Attorney, Agent, or Firm—Peter K. Kontler

[57] ABSTRACT

A torque transmitting mechanism which operates between the crankshaft of the engine and the input shaft of the change-speed transmission in a motor vehicle has a first flywheel which is driven by the crankshaft, a second flywheel which can drive the input shaft through the medium of a friction clutch, and three series-connected dampers between the two flywheels. At least one of the dampers is a slip clutch, and the torque which can be transmitted by such slip clutch is variable. The dampers are designed to compensate for all fluctuations of torque which is transmitted between the crankshaft to the input shaft. The first damper can constitute a slip clutch the input element of which receives torque from the crankshaft, the second damper can constitute a slip clutch the input element of which is the output element of the first damper and the output element of which is the input element of an elastic damper operating between the second slip clutch and the second flywheel.

42 Claims, 4 Drawing Sheets

TORQUE TRANSMITTING MECHANISM

BACKGROUND OF THE INVENTION

The invention relates to improvements in mechanisms for transmitting torque between driving and driven parts, especially between the crankshaft of an internal engine and the input shaft of a change-speed transmission in a motor vehicle. More particularly, the invention relates to improvements in torque transmitting mechanisms of the type wherein a first flywheel is connected to the output member of the engine, a second flywheel is connected or connectable to the input member of the transmission, and the means for transmitting torque between the flywheels comprises several dampers. Torque transmitting mechanisms of such character are disclosed in numerous pending United States and foreign patent applications as well as in numerous United States and foreign patents of the assignee.

U.S. Pat. No. 4,274,524 to Nakane discloses a rotational torque transmitting mechanism wherein the means for transmitting torque between the flywheels comprises a damper and a torque limiting clutch. The damper comprises coil springs and a friction generating device which latter operates in parallel with the coil springs. The torque limiting clutch is a slip clutch having a constant slip torque considerably exceeding the nominal torque which is generated by the engine, i.e., the slip clutch responds only when the transmitted torque fluctuates within a wide range.

The purpose of the patented mechanism is to reduce the stresses upon the power train between the engine and the wheels as well as to enhance the comfort of the passengers and to reduce noise. It has been found that the patented mechanism cannot operate satisfactorily within the entire RPM range of the engine, and one of the reasons for such failure is believed to be that the slip clutch responds only to very pronounced fluctuations of torque which is transmitted by the engine, i.e., well above the nominal torque of the engine. Moreover, the slip clutch transmits a pronounced torque also when the engine is operated at a low RPM, namely when the transmitted torque is small, with the result that the slip clutch cannot compensate for and/or counteract smaller fluctuations of torque when the RPM of the engine is low.

OBJECTS AND SUMMARY OF THE INVENTION

An object of the invention is to provide a mechanism for transmitting, and for absorbing variations of, torque between a driving member (e.g., the crankshaft of an internal combustion engine) and a driven member (such as the input shaft of a change-speed transmission in a motor vehicle) in such a way that the parts of the mechanism can counteract deviations of transmitted torque from optimum torque within a wider range than heretofore known mechanisms.

Another object of the invention is to provide a simple, compact and inexpensive torque transmitting mechanism which comprises a relatively small number of simple parts.

A further object of the invention is to provide a mechanism wherein the rotary parts are centered in a novel and improved way.

An additional object of the invention is to provide a power train which embodies the above outlined mechanism.

Still another object of the invention is to provide a novel and improved method of controlling the transmission of torque between the crankshaft of the engine and the input shaft of the change-speed transmission in a motor vehicle within the entire range of rotational speeds of the engine.

A further object of the invention is to provide novel and improved means for transmitting torque between two relatively rotatable flywheels in the power train of a motor vehicle.

An additional object of the invention is to provide a novel and improved combination of dampers for use in the above outlined mechanism.

A further object of the invention is to provide a novel and improved arrangement for mounting the dampers on or in the flywheels of the torque transmitting mechanism.

Another object of the invention is to provide a mechanism wherein the rotary parts are mounted in such a way that they are less likely to run out of true than in conventional mechanisms.

An additional object of the invention is to provide a mechanism wherein the parts which move relative to each other are protected against excessive wear in a novel and improved way.

A further object of the invention is to provide novel and improved flywheels for use in the above outlined mechanism.

The invention resides in the provision of a mechanism for transmitting and for absorbing variations of torque. The mechanism comprises a first flywheel which is connectable to the engine (for example, to the crankshaft which is driven by the engine) and a second flywheel which is rotatable relative to the first flywheel and is connectable to the input member of a change-speed transmission in a motor vehicle (for example by way of a friction clutch). The mechanism further comprises at least three dampers which are arranged to operate between the flywheels one after the other. Each damper includes at least one input element and at least one output element. The input or output elements of at least two of the dampers are rotatable relative to the flywheels, and the mechanism further comprises means for centering the rotatable elements of the at least two dampers relative to one of the flywheels. One of the rotatable elements can constitute the output element of one of the at least two dampers as well as the input element of further damper (such as an elastic damper with one or more coil springs) of the at least three dampers. The centering means can comprise an axial protuberance on the one flywheel and a collar or sleeve which spacedly surrounds the protuberance and is provided on the one flywheel. One of the rotatable elements is centered by the protuberance and the other of the rotatable elements is centered by the collar.

The one rotatable element can be provided with a central opening for the protuberance, and the collar can be provided with an internal surface which surrounds the other rotatable element. The arrangement is preferably such that the one rotatable element has an internal surface which surrounds the opening and also surrounds the periphery of the protuberance.

Friction influencing lining or linings can be provided between the protuberance and one rotatable element, as well as between the collar and the other rotatable element. The friction influencing linings can be provided on the protuberance and on the collar or on the adjacent rotatable elements. The lining or linings can be made of hardened nickel, chromium, molybdenum or other metallic material. Alternatively, the friction influencing linings can contain polytetrafluoroethylene (such as Teflon, trademark).

In accordance with a presently preferred embodiment of the invention, the centering means are provided on the first flywheel. Antifriction bearing means can be mounted on the protuberance and the second flywheel can be mounted on the bearing means. The first flywheel can further comprise a substantially radially extending wall between the protuberance and the collar, and the centering means can comprise a cylindrical or substantially cylindrical surface which is provided on the protuberance axially between the bearing means and the wall, and the one rotatable element can surround such surface. Each of the rotatable elements can comprise a disc, and the two discs are preferably disposed in planes which extend at right angles to the axis of the first flywheel. The plane of one of the discs is preferably immediately adjacent to or coincides with the plane of the other disc.

One of the dampers can include an elastic damper, and the dampers can further comprise two fictional damping devices which operate in series. One of the damping devices receives torque from the engine (i.e., from the first flywheel), the other frictional damping device receives torque from the one frictional damping device, and such other frictional damping device can transmit torque to the elastic damper which, in turn, transmits torque to the second flywheel.

One of the frictional damping devices is preferably disposed radially outwardly of the other frictional damping device.

In accordance with a presently preferred embodiment of the invention, the dampers include a first damper and a second damper. Each of the first and second dampers has a pair of axially space-apart annular surfaces which rotate with one of the flywheels. One surface of each pair of surfaces is movable axially of the respective flywheel toward and away from the other surface of the corresponding pair of surfaces, and each of the first and second dampers further comprises at least one annular flange between the surfaces of the respective pair. The flanges are in frictional engagement with the surfaces of the respective pairs of surfaces. One of the flanges constitutes one of the aforementioned rotatable elements, and the other of the flanges constitutes the other of the rotatable elements. One of the flanges preferably surrounds the other flange, and the flanges are at least substantially coplanar.

The flanges are preferably rotatable relative to each other, and the mechanism further comprises means for limiting the extent of angular movability of the flanges relative to each other. Each of the dampers is preferably arranged to transmit between the flywheels torque within a predetermined range, and the surrounding (radially outer) flange is rotatable relative to the surfaces of the respective pair of surfaces through any desired angle when the magnitude of torque which is transmitted by the damper including the surrounding flange rises above the respective range. The dampers of such mechanism further include an elastic third damper which operates between the surrounded flange and that flywheel which is rotatable relative to the annular surfaces.

At least one of the first and second dampers further comprises friction influencing linings between its annular surfaces and the respective flange. Each lining of one of the pairs of linings is or can be integral with one lining of the other pair of linings. Thus, the linings of the one pair of linings and the linings which are integral therewith form two washers. Each of the washers can have at least one aperture in the form of a circular or otherwise configurated opening serving to collect material which is removed from the adjacent surfaces as a result of frictional engagement. The washers are preferably loosely installed between the flanges and the respective annular surfaces, and the aforementioned collar of the first flywheel can serve as a means for centering the washers around the protuberance of the first flywheel. In accordance with a presently preferred embodiment, the annular surfaces of the first and second dampers are rotatable with the first flywheel.

The surrounding flange can be provided with at least one radially inwardly extending projection, and the surrounded flange has two radially outwardly extending projections which flank the radially inwardly extending projection with a predetermined play so as to allow for limited angular movement of the flanges relative to each other.

The elastic damper can comprise two coaxial discs which rotate with one of the flywheels (preferably with the second flywheel). One of the rotatable elements is disposed between the discs of the elastic damper and such one rotatable element and the discs have registering windows. The elastic damper further comprises resilient energy storing means (for example coil springs) mounted in the registering windows to yieldably oppose angular movements of the discs and the one rotatable element relative to each other. The thickness of one of the discs can deviate from the thickness of the other of the discs. The arrangement is preferably such that the disc which is thinner is nearer to the second flywheel. The ratio of thicknesses of the discs is preferably between 1:1.5 and 1:3. The elastic damper preferably further comprises means for limiting the angular movability of the one rotatable element relative to the discs. The one rotatable element of such mechanism has at least one circumferentially extending opening and the limiting means can comprise a fastener which connects the discs with one another and with the second flywheel and extends with clearance through the opening. The opening can constitute an elongated slot and the fastener can include a rivet-like member which is anchored in the second flywheel and serves to maintain the discs at a fixed axial distance from one another at opposite sides of the one rotatable element.

The novel features which are considered as characteristic of the invention are set forth in particular in the appended claims. The improved torque transmitting mechanism itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
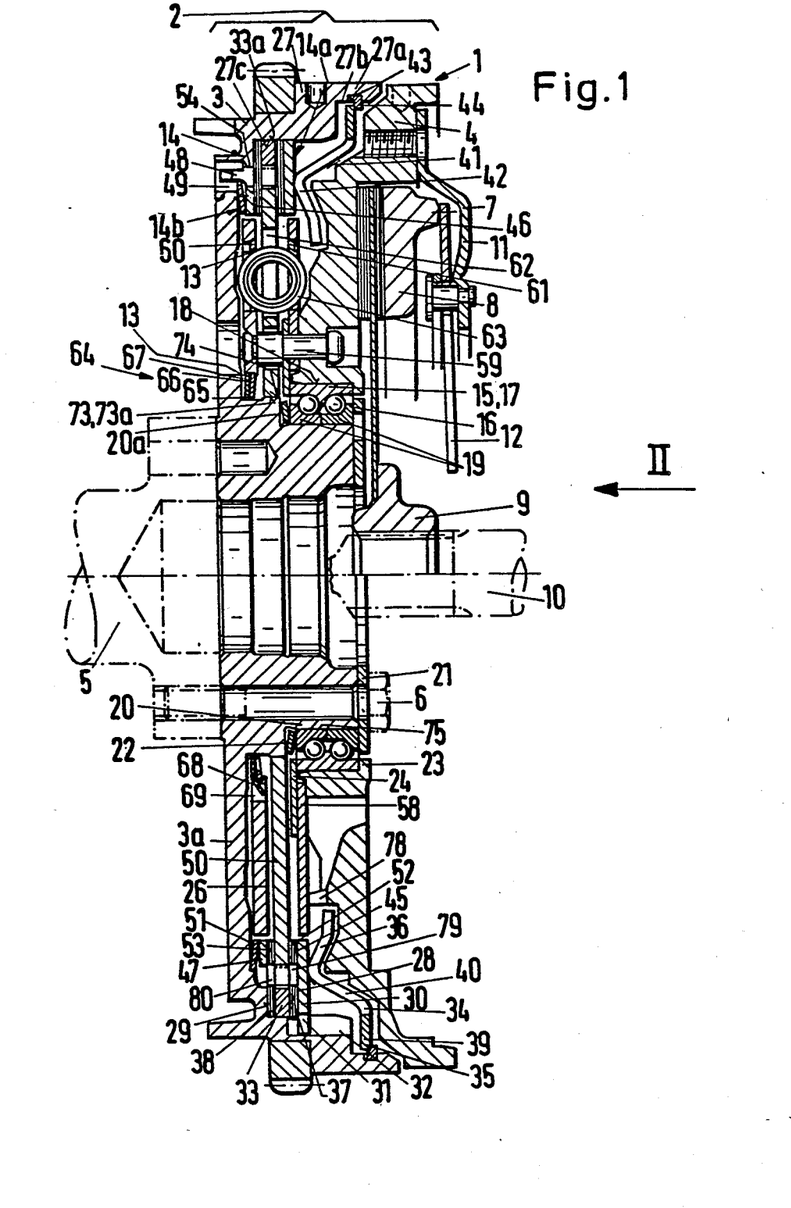
FIG. 1 is an axial sectional view of a torque transmitting mechanism which embodies one form of the present invention.
Figure 2:
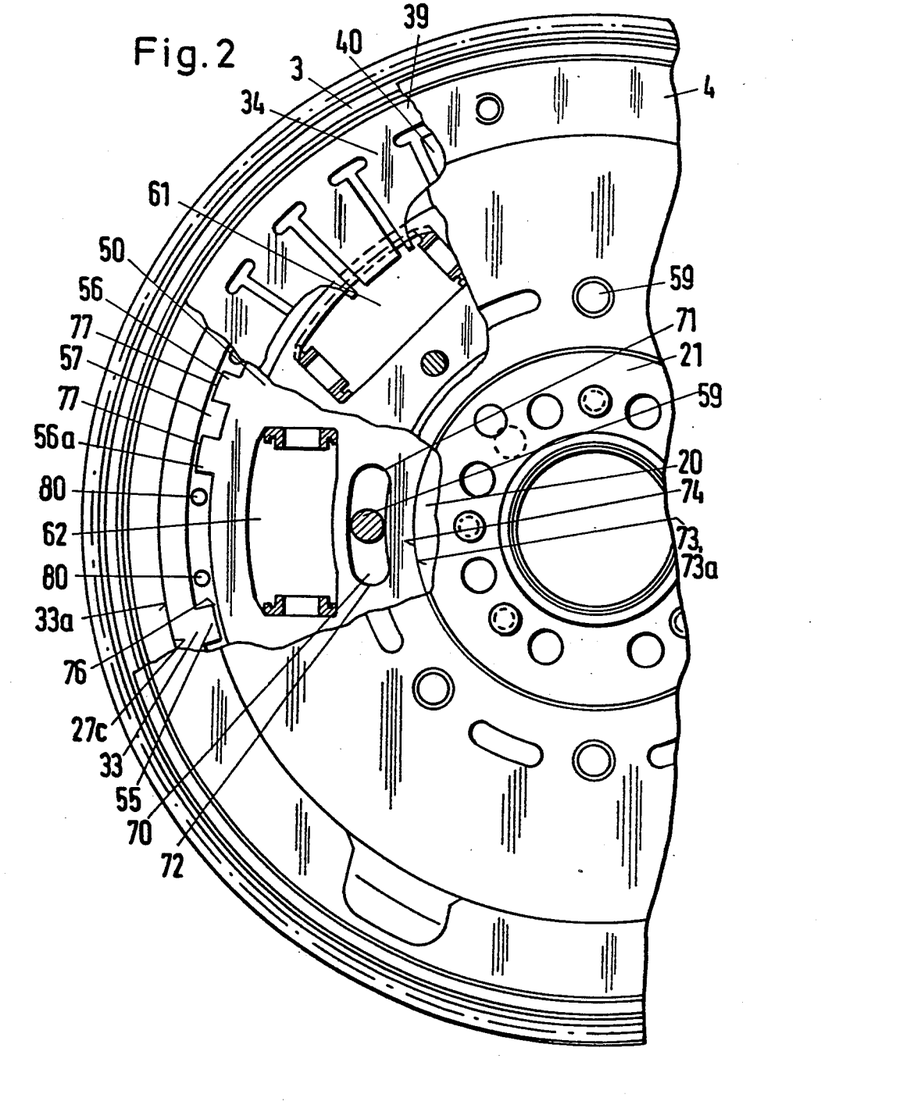
FIG. 2 is a fragmentary elevational view of the mechanism as seen in the direction of arrow II in FIG. 1, with a portion of one of the flywheels broken away.

Referring first to FIGS. 1 and 2, there is shown a mechanism 1 serving to compensate for variations of torque which is transmitted between an internal combustion engine and a change-speed transmission in a motor vehicle. The mechanism comprises a composite flywheel 2 including a first flywheel 3 which is secured to the crankshaft 5 of the engine by bolts 6 or similar fasteners, and a second flywheel 4 which is rotatable relative to the flywheel 3 and can drive the input shaft 10 of a change-speed transmission through the medium of a friction clutch 7. The friction clutch 7 comprises a cover 11 which is bolted or otherwise secured to the flywheel 4, a pressure plate 8 which is movable axially toward and away from the flywheel 4, a clutch plate 9 which is disposed between the pressure plate 8 and the flywheel 4 and has a splined hub nonrotatably mounted on the input shaft 10, and a diaphragm spring 12 which reacts against the cover 11 and bears against the pressure plate 8 to normally urge the plate 8 against the clutch plate 9 so that the latter is rotated by the flywheel 4 when the clutch 7 is engaged.

In accordance with the invention, the means for transmitting torque between the flywheels 3 and 4 comprises a set of at least three dampers including an elastic damper 13 and a composite slip clutch 14 including a first frictional damping device or damper 14a and a second frictional damping device or damper 14b. The elastic damper 13 operates in series with the slip clutch 14, and the dampers 14a, 14b also operate in series. The slip clutch 14 permits the flywheels 3 and 4 to rotate relative to each other when the magnitude of torque which is transmitted thereby exceeds a predetermined minimum torque.

The flywheel 4 is mounted on an axial centering protuberance 20 of the flywheel 3 through the medium of a bearing means 15 including an antifriction ball bearing 16 having two rows of spherical rolling elements. The bearing 16 has a one-piece outer race 17 and a two-piece inner race 19, and this bearing acts as a radial as well as an axial or thrust bearing.

The outer race 17 of the bearing 16 is installed in an axial bore 18 of the flywheel 4, and the inner race 19 is mounted on and is centered by the protuberance 20 of the flywheel 3. The protuberance 20 extends in a first axial direction, and the crankshaft 5 of the engine extends in the opposite axial direction. The surface surrounding the bore 18 is spaced apart from the peripheral surface of the protuberance 20.

The inner race 19 of the bearing 16 is confined between a disc-shaped retainer 21 and a peripheral shoulder 20a of the protuberance 20. The retainer 21 is screwed, bolted or otherwise affixed to the protuberance 20. In the illustrated embodiment, the bolts 6 which are used to secure the flywheel 3 to the crankshaft 5 serve as a means for securing the retainer 21 to the adjacent end face of the protuberance 20. A diaphragm spring 22 is installed between the shoulder 20a of the protuberance 20 and the adjacent end face of the inner race 19 so as to bias the inner race toward the disc-shaped retainer 21. The diaphragm spring 22 further serves to bias the spherical rolling elements of the bearing 16 against the adjacent radially extending portions of the inner and outer races 19 and 17.

The means for maintaining the outer race 17 of the bearing 16 in a predetermined axial position relative to the flywheel 4 comprises a shoulder 23 which is provided on the flywheel 4 and extends radially inwardly beyond the surface surrounding the bore 18, and a disc 24 which is secured to the flywheel 4 and abuts the left-hand end face of the outer race 17, as seen in FIG. 1.

The protuberance 20 constitutes a first centering member of the flywheel 3, and this flywheel comprises a second centering member in the form of a ring-shaped sleeve or collar 27 which is integrally connected with the protuberance 20 by a radially extending wall 3a of the flywheel 3. The collar 27 surrounds and is spaced apart from the elastic damper 13. Furthermore, the collar 27 surrounds the dampers 14a and 14b of the composite slip clutch 14. The damper 14a is disposed radially outwardly of the damper 14b, and the arrangement is such that the slip clutch 14 operates stepwise so as to allow for a stepwise buildup of the maximum slip torque. As can be seen in FIG. 1, the outer damper 14a of the composite slip clutch 14 is at least substantially coaxial with the inner damper 14b, and the general plane of the outer damper 14a (as seen in a direction at right angles to the axis of the flywheel 3) coincides with or is close to the general plane of the inner damper 14b.

The outer damper 14a of the composite slip clutch 14 comprises two concentric annular surfaces 28, 29 which are disposed in parallel planes extending at right angles to the axis of the flywheel 3 and are compelled to share all angular movements of the flywheel 3. Their purpose is to transmit torque which is generated by the engine from the crankshaft 5 and flywheel 3 to the inner damper 14b. In the embodiment of FIGS. 1 and 2, the annular surface 29 is provided directly on the flywheel 3 and the surface 28 is provided on a disc 30. The disc 30 is formed with radially outwardly extending projections 31 which serve to hold it against rotation relative to the flywheel 3. To this end, the collar 27 of the flywheel 3 has radially inwardly extending teeth 32 defining tooth spaces for the projections 31. This ensures that the projections 31 are held against rotation relative to the teeth 32 but the disc 30 is movable axially toward and away from the annular surface 29 on the flywheel 3.

The output element of the outer damper 14a is a disc-shaped flange 33 which is clamped between the annular surfaces 28 and 29. The means for clamping the flange 33 between the surfaces 28 and 29 comprises a diaphragm spring 34 having a radially outermost portion 35 which reacts against the collar 27 and a radially inner or innermost portion 36 which bears against the disc 30 and urges it axially toward the annular surface 29 on the flywheel 3.

Friction influencing (friction generating) linings 37 and 38 are interposed between the annular surfaces 28, 29 and the respective sides of the flange 33.

The diaphragm spring 34 comprises an annular section 39 which is disposed in the region of the radially outermost portion 35, and radially inwardly extending tongues 40 which define the radially innermost portion 36 and bear against the respective side of the disc 30. The configuration of the tongues 40 is such that their outer portions 41 extend substantially axially toward the disc 30 from the innermost portion of the annular section 39. The next-following portions 42 of the tongues 40 extend slightly in a direction away from and are out of contact with the disc 30. It will be noted that the portions 42 of the tongues 40 are axially offset relative to the annular section 39 of the diaphragm spring 34.

The collar 27 of the flywheel 3 comprises a relatively narrow or thin end portion 27a surrounding an internal surface 27b which is provided with a circumferentially extending groove 43 for a split ring 44 serving as a means for holding the diaphragm spring 34 against axial movement in a direction away from the radial wall 3a of the flywheel 3. The split ring 44 the radially outermost portion 35 of the diaphragm spring 34 and further comprises an axially extending portion which surrounds the periphery of the diaphragm spring 34. This enables the diaphragm spring 34 to keep the split ring 44 in the groove 43 against accidental separation from the collar 27.

The inner damper 14b of the composite slip clutch 14 operates between the outer damper 14a and the elastic damper 13. The damper 14b has two concentric annular surfaces 45, 46 which are compelled to share all angular movements of the flywheel 3, the same as the annular surfaces 28, 29 of the damper 14b. The annular surface 45 is provided on a radially inner portion of the aforementioned disc 30, and the annular surface 46 is provided on a further disc 47 which is adjacent the inner side of the radial wall 3a of the flywheel 3. It will be noted that the disc 30 is common to the dampers 14a and 14b. This contributes to simplicity and compactness of the composite slip clutch 14.

The disc 47 has axially extending projections 48 which are in mesh with complementary projections 49 of the flywheel 3. This ensures that the disc 47 and its annular surface 46 are compelled to share all angular movements of the flywheel 3. The projections 48 and 49 allow the disc 47 to move axially of the flywheel 3 under the bias of or against the opposition of a diaphragm spring 51 which reacts against the radial wall 3a. The output element of the inner damper 14b is a disc-shaped flange 50 which is disposed radially inwardly of the flange 33 and is clamped between the annular surfaces 45 and 46. The diaphragm spring 51 constitutes a means for ensuring that the flange 50 is reliably clamped between the annular surfaces 45 and 46. The arrangement is such that the radially outermost portion of the diaphragm spring 51 reacts against the radial wall 3a and its radially innermost portion bears against the disc 47.

Friction influencing linings 52 and 53 are interposed between the annular surfaces 45, 46 and the corresponding sides of the inner flange or output element 50.

The friction influencing lining 37 is integral with the lining 52 to form therewith a first washer at one side of the flanges 33 and 50, and the friction influencing linings 38 and 53 together form a second one-piece washer at the other side of the flanges 33 and 50. The two washers are loosely inserted between the respective annular surfaces and the corresponding flanges so as to facilitate assembly and to reduce the overall cost of the composite slip clutch 14. It is not necessary to utilize glue or any other adhesive material to bond the friction influencing linings 37, 38, 52 and 53 to the respective annular surfaces or to the corresponding flanges.

The collar 27 of the flywheel 3 has an internal cylindrical surface 27c which centers the two washers 37, 52 and 38, 53 to hold them in predetermined radial positions relative to the annular surfaces 28, 29, 45, 46 and flanges 33, 50. The cylindrical internal surface 27c of the collar 27 further serves to center the outer flange 33. To this end, the peripheral surface 33a of the flange 33 is immediately adjacent or abuts the corresponding portion of the internal surface 27c.

FIG. 1 shows that the surfaces 28, 45 are disposed in a first common plane (or very close to a common plane) and that the surfaces 29, 46 are also disposed in a common plane. The flywheel 3 has a ring-shaped recess 54 located radially inwardly of the annular surface 29 and serving to receive the disc 47 as well as the diaphragm spring 51.

The diaphragm springs 34 and 51 of the dampers 14a and 14b are installed in prestressed condition. The diaphragm spring 34 acts axially of the flywheel 3 in a first direction, and the diaphragm spring 51 acts axially of the flywheel 3 in the opposite direction. The bias of the diaphragm spring 34 exceeds the bias of the diaphragm spring 51. This ensures that the outer damper 14a of the composite slip clutch 14 transmits torque even when the flywheel 3 is rotated at a very low speed.

The flanges 33 and 50 (which respectively constitute the output elements of the dampers 14a and 14b) have limited freedom of angular movement relative to each other. The means for limiting such angular movements comprises one or more radially inwardly extending projections 55 which are provided on the outer flange 33 and extend inwardly toward the periphery of the inner flange 50, and pairs of radially outwardly extending projections 56, 56a which flank the inwardly extending projections 55 of the outer flange 33. In the embodiment which is shown in FIGS. 1 and 2, the flanges 33 and 50 can turn relative to each other through a maximum angle of approximately 25 degrees. This angle can be increased or reduced, depending on the intended use of the mechanism. For example, the angle can be reduced to 10 degrees or increased to 125 degrees without departing from the spirit of the invention.

The feature that the inner flange 50 has a separate set of projections (56 and 56a) for each direction of rotation is desirable and advantageous because this renders it possible to make the flanges 33 and 50 in a single operation by stamping the projections 55 of the outer flange 33 between the neighboring radially outwardly extending projections 56a, 56 of the inner flange 50. The clearances between the projections 56, 56a are denoted in FIG. 2 by the character 57.

The flange 50 not only constitutes the output element of the inner damper 14b but also the input element of the elastic damper 13. The damper 13 further comprises two discs 26 and 58 which are disposed at opposite sides of the flange 50 and are held at a fixed axial distance from each other by distancing elements 59 in the form of rivets which are anchored in the flywheel 4. The damper 13 also comprises a set of energy storing elements in the form of coil springs 63 which are disposed radially outwardly of the distancing element 59. The distancing elements 59 further serve as a means for securing the disc 24 to the flywheel 4. As can be seen in FIG. 1, the disc 24 is held between the heads of the distancing elements 59 and the respective side of the disc 58. The disc 24 serves to fix of the outer race 17 of the bearing 16 in a selected axial position. To this end, the radially innermost portion of the disc 24 extends beyond the radially innermost portion of the disc 58.

The disc 26, the disc 58 and the flange 50 are respectively provided with registering closed window-shaped openings 60, 61 and 62 for the coil springs 63. The coil springs oppose angular movements of the flange 50 and the discs 26, 58 relative to each other.

The means for transmitting torque between the flywheels 3 and 4 further comprises a friction generator 64 which operates in parallel with the coil springs 63 of the elastic damper 13. The friction generator 64 surrounds the protuberance 20 of the flywheel 3 and is substantially coplanar with the disc 26. It comprises a diaphragm spring 65 which is stressed between the disc 26 and a washer 66. A friction washer 67 is installed between the washer 66 and the radial wall 3a of the flywheel 3. The washer 66 is provided with radially outwardly extending arms 68 extending into tooth spaces 69 of the disc 26 so as to ensure that the disc 26 and the washer 66 invariably rotate as a unit.

FIG. 2 shows that the inner flange 50 has openings in the form of elongated arcuate slots 70 receiving with clearance the intermediate portions of the distancing elements 59. The distance between the surfaces 71 and 72 flanking the ends of a slot 70 minus the diameter of the respective distancing element 59 determines the extent to which the flywheel 4 and the inner flange 50 are rotatable relative to each other. The extent to which the flange 50 and the flywheel 4 can turn relative to each other will determine the maximum extent of compression of coil springs 63, i.e., the compression of coil springs 63 is terminated when a distancing element 59 abuts the surface 71 or 72 in the respective slot 70 of the flange 50.

The inner flange 50 has a circular central opening 73 surrounded by an internal surface 73a which is centered on the protuberance 20 of the flywheel 3 so that the flange 50 cannot wobble radially of the flywheel 3. The internal surface 73a immediately surrounds that cylindrical external surface 74 of the protuberance 20 which is adjacent to the shoulder 20a. FIG. 1 shows that the diameter of the cylindrical surface 74 exceeds the diameter of that (cylindrical) portion 75 of the protuberance 20 which is surrounded by the composite inner race 19 of the bearing 16. The surface 74 which is surrounded by the flange 50 is disposed between the bearing 16 and the radial wall 3a of the flywheel 3. The aforementioned slots 70 of the inner flange 50 are located radially between the central opening 73 and the windows 62 for the coil springs 63.

FIG. 2 shows that the inwardly extending projections 55 of the outer flange 33 are spaced apart from the adjacent portions of the peripheral surface of the inner flange 50 so that the flange 50 and the projections 55 define narrow clearances 76. Similar narrow clearances 77 are provided between the radially outwardly extending projections 56, 56a of the inner flange 50 and the adjacent internal surface of the outer flange 33. The clearances 76 and 77 facilitate radial centering of the flanges 33 and 50.

Referring again to FIG. 1, the thickness of the disc 26 forming part of the elastic damper 13 exceeds the thickness of the disc 58. The thickness of the disc 26 can be between 1.5 and three times the thickness of the disc 58. The purpose of making the disc 26 (which is more distant from the flywheel 4 than the disc 26) thicker is to ensure that the disc 26 cannot be deformed under the action of the coil springs 63 when the springs 63 are acted upon by centrifugal force. In order to prevent undesirable bending or other deformation of the relatively thin disc 58, the flywheel 4 is provided with axially extending protuberances 78 which abut the radially outermost portion or portions of the adjacent disc 58. The manner in which the protuberances 78 of the flywheel 4 are distributed in the circumferential direction of the disc 58 will depend upon the thickness of the disc 58 as well as on certain other parameters. In the illustrated embodiment, the flywheel 4 is provided with two protuberances 78 between each pair of neighboring coil springs 63. Such protuberances are disposed radially outwardly of the axes of the coil springs 63.

The washer which includes the friction influencing linings 37 and 52 is provided with openings 79, and the washer including the friction influencing linings 38 and 55 is provided with openings 80. The purpose of such openings is to gather fragments of material which is removed as a result of frictional engagement of the linings with the annular surfaces and flanges of the respective dampers 14a and 14 b. The openings 79, 80 are disposed at a predetermined radial distance from the common axis of the flanges 33, 50, preferably at the level of the projections 55 which extend inwardly from the outer flange 33 and of the radially outwardly projections 56, 56a of the inner flange 50. This can be seen in FIG. 2.

The mode of operation of the mechanism 1 which is shown in FIGS. 1 and 2 will be described with reference to the diagram of FIG. 3 wherein the angular displacement of the flywheels 3 and 4 relative to each other is measured (in degrees) along the abscissa, and the moment (M) which can be transmitted by the composite slip clutch 14 and elastic damper 13 is measured along the ordinate. It is to be noted that the moment which can be transmitted by the composite slip clutch 14 is not constant because the magnitude of the moment which can be transmitted by the outer damper 14a is variable by centrifugal force acting upon the diaphragm spring 34.

It is assumed that the projections 55 of the outer flange 33 abut the projections 56, 56a of the inner flange 50, i.e., that the flywheels 3 and 4 are located in positions in which the flanges 33 and 50 can turn through a maximum angle relative to each other.

Figure 3:
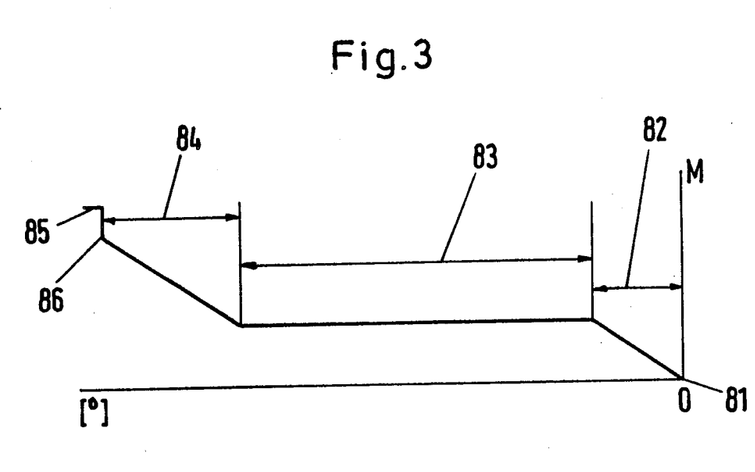
FIG. 3 is a diagram wherein the curve denotes the magnitude of torque which can be transmitted by the mechanism of FIGS. 1 and 2 in response to angular displacement of the flywheels relative to each other.

The character 81 denotes in FIG. 3 the starting positions of the flywheels 3 and 4 relative to each other. If one of the flywheels 3, 4 turns relative to the other flywheel, at least some of the coil springs 63 forming part of the elastic damper 13 are compressed and store energy until the moment which is generated by such coil springs overcomes the slip torque of the inner damper 14b. This takes place when the angular displacement of the flywheels 3 and 4 relative to each other exceeds the angle 82. If at least one of the flywheels 3, 4 continues to turn relative to the other flywheel, the flange 50 and the annular surfaces 45, 46 of the inner damper 14b turn relative to each other until the projections 55 reach and engage the projections 56 or 56a, depending upon the direction of rotation of the flywheels 3 and 4 relative to each other. The projections 55 reach the projections 56 or 56a when the flywheels 3, 4 complete a relative angular movement through an angle 82 plus 83. The angle 83 can be selected within a wide range. As pointed out before, the flanges 33 and 50 can turn relative to each other through an angle of between 10 and 120 degrees. The angle which is shown in FIG. 2 is approximately 25 degrees.

If the flywheel 3 continues to turn relative to the flywheel 4 (or vice versa) in the same direction, i.e., if the combined angle 82 plus 83 is exceeded, the coil springs 63 continue to store energy because the outer damper 14a can transmit a rather high torque. When the angular movement reaches 82 plus 83 plus 84 degrees, the distancing elements 59 strike against the surface 71 or 72 in the respective slots 70 so that the coil springs 63 cannot store additional energy. In other words, the elastic damper 13 does not allow any further angular displacement of the inner flange 50 and flywheel 4 relative to each other. At such time, the flywheels 3 and 4 can continue to turn relative to each other only if the torque which is transmitted by the internal combustion engine to the flywheel 3 exceeds the torque which can be transmitted by the outer damper 14a. Such situation will arise, for example, when the peaks of torque that is transmitted by the engine are very pronounced. The torque which can be transmitted by the outer damper 14a is denoted by the character 85; it is greater than the torque 86 at which the compression of the coil springs 63 is terminated, i.e. when the coil springs 63 act as rigid bodies.

It is often desirable to ensure that the torque which can be transmitted by the outer damper 14a be smaller than the torque at which the compression of coil springs 63 is terminated before the engine reaches a certain rotational speed. When the magnitude of torque which is transmitted by the outer damper 14a is exceeded, the flywheels 3 and 4 can turn relative to each other through any angle. In other words, there is no provision for any stop or stops which would prevent the flywheels 3 and 4 form turning relative to each other when the maximum torque which can be transmitted by the outer damper 14a is exceeded.

In the embodiment which is shown in FIGS. 1 to 3, the torque 85 corresponds to the minimum torque which can be transmitted by the outer damper 14a. Thus, such torque will be transmitted by the damper 14a even if the rotational speed of the engine and flywheel 3 is reduced to zero.

Figure 4:
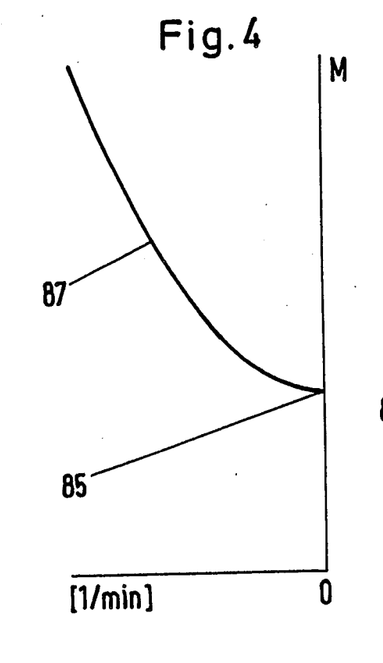
FIG. 4 is a diagram showing the magnitude of torque which can be transmitted by one of the slip clutches.

In the diagram of FIG. 4, the rotational speed (in revolutions per minute) is measured along the abscissa and the moment (M) which is transmitted by the outer damper 14a of the composite slip clutch 14 is measured along the ordinate. As already mentioned above, the design of the composite damper 14 is such that, in view of the initial stressing of the diaphragm spring 34, the outer damper 14a can transmit a torque 85 even if the rotational speed of the engine is zero. Since the portions 41 and 42 of the prongs or tongues 40 of the diaphragm spring 34 are axially offset relative to the annular section 39, the portions 41 and 42 tend to transmit to the annular portion 39 a moment under the action of centrifugal force when the engine rotates the flywheel 3. However, and since the tongues 40 abut the disc 30, the disc 30 is acted upon by the diaphragm spring 34 and is subjected to the action of an axial force. The magnitude of such axially oriented force increases with the rotational speed of the engine in a manner as denoted by a substantially paraboloid curve 87 which is shown in FIG. 4. The tongues 40 of the diaphragm spring 34 are configurated and dimensioned in such a way that the torque which is denoted by the curve 87 and is transmitted by the composite slip clutch 14 (actually by the outer damper 14a') is invariably greater than the moment which is transmitted by the engine. This means that, with reference to the RPM range of the engine, the torque which can be transmitted by the composite slip clutch 14 is invariably greater than the torque which is transmitted by the internal combustion engine.

Figure 5:
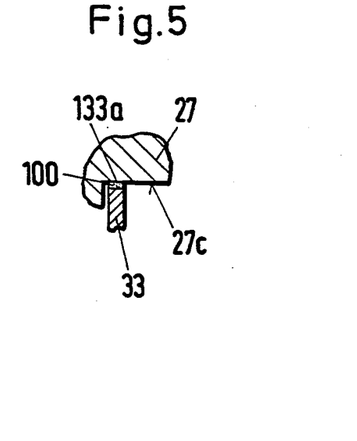
FIG. 5 is a fragmentary sectional view of a detail in a second mechanism and shows one mode of reducing wear upon the first flywheel and the adjacent rotary element of one of the slip clutches.

FIG. 5 shows a modification wherein a friction influencing lining 100 is installed between the peripheral surface 133a of the outer flange 33 and the cylindrical internal surface 27c of the collar 27. The lining 100 can be selected with a view to increase or to reduce friction between the flywheel 3 and the flange 33. This lining can be bonded (for example by a suitable adhesive) to the peripheral surface 133a or to the internal surface 27c.

Figure 6:
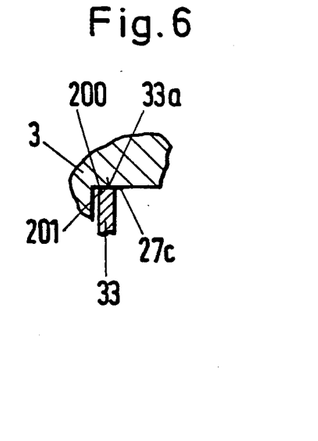
FIG. 6 is a similar sectional view of a third mechanism showing modified means for reducing friction between the first flywheel and the adjacent rotary element of one of the slip clutches.

FIG. 6 shows a modification wherein a lining 200 is applied to the internal surface 27c of the collar of the flywheel 3, and a lining 201 is applied to the peripheral surface 33a of the flange 33. The lining 200 and/or 201 not only influences friction but it also resists excessive wear to thus prolong the useful life of the flange 33 and of the flywheel 3.

Figure 7:
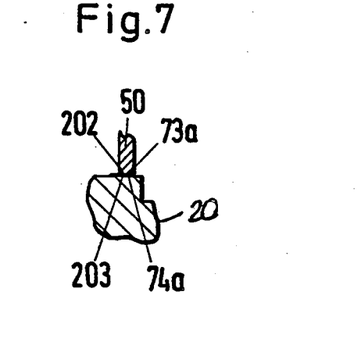
FIG. 7 is a similar fragmentary sectional view showing the manner of reducing wear upon the protuberance of the first flywheel and the adjacent output element of the other slip clutch.

FIG. 7 shows friction influencing wear-resistant linings 202 and 203 which are respectively applied to the internal surface 73a of the inner flange 50 and to the peripheral surface 74a of the protuberance 20. The main function of the linings 202, 203 is to reduce wear upon the surfaces 73a and 74a, i.e., in the region where the flange 50 is centered on the protuberance 20.

The linings 200, 201 of FIG. 6 and the linings 202, 203 of FIG. 7 can constitute layers of hardened nickel (known as Durnicoat, trademark). Alternatively each of the linings 200, 201, 202, 203 can contain polytetrafluoroethylene (such lining or linings can be made of TEFLON (trademark). The material of the lining 200 need not be the same as the material of the lining 201, and this also applies for the linings 202, 203. It depends on the desired nature of the linings, i.e., whether they are intended primarily to reduce friction, to increase friction or to reduce wear.

Figure 8:
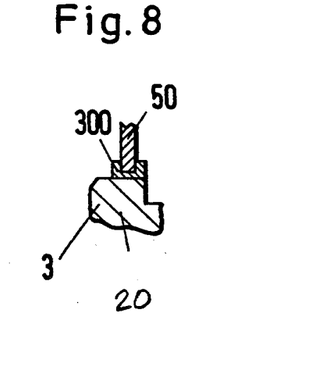
FIG. 8 is a similar fragmentary sectional view showing different friction influencing means between the first flywheel and the adjacent rotary element.

FIG. 8 shows a ring-shaped friction influencing lining 300 which defines an annular seat for the radially innermost portion of the flange 50 and surrounds the cylindrical peripheral surface of the protuberance 20 of the flywheel 3. The arrangement is preferably such that the lining 300 rotates with the flange 50. This can be achieved by utilizing a suitable adhesive which bonds the surface surrounding the groove in the periphery of the friction influencing lining 300 to the adjacent internal surface and adjacent portions of lateral surfaces of the flange 50.

The linings 200, 201 or 202, 203 can be applied in addition to the friction influencing lining 200 of FIG. 5 and/or in addition to the friction influencing lining 300 of FIG. 8. This even further reduces the likelihood of excessive wear upon the collar 27, flange 33, protuberance 20 and flange 50.

It is further clear that the materials of the linings 100, 200, 201, 202, 203 and/or 300 can be selected from a wide range of materials which are suitable to increase or to reduce friction and/or to reduce wear. Such materials include chromium, molybdenum and many others.

An important advantage of the improved torque transmitting mechanism is that the output elements 33 and 50 are invariably properly centered by one and the same flywheel (3). Moreover, the versatility of the improved mechanism greatly exceeds those of heretofore known mechanisms including that disclosed in the patent to Nakane. This is due to the fact that the improved mechanism comprises at least three dampers which operate in series. Each of the output elements 33 and 50 is rotatable relative to the flywheel 3 as well as relative to the flywheel 4. Proper centering of the output elements 33 and 50 reduces the likelihood of running out of true which could affect the useful life of the torque transmitting mechanism and could generate excessive noise. The feature that one of the elements 33, 50 can constitute the output element of one damper as well as the input element of another damper contributes to simplicity and compactness of the mechanism.

The placing of elements 33 and 50 into a common plane also contributes to compactness and simplicity of the improved mechanism. This also applies for the feature that the friction linings of the outer damper 14a are integral with the corresponding (coplanar) friction linings of the inner damper 14b.

Though the illustrated embodiments comprise a twin or composite slip clutch 14 which is composed of two serially operated dampers 14a, 14b, it is equally within the purview of the invention to employ two independent dampers plus the elastic damper 13. As described, one of the dampers 14a operates within a given angle whereas the other of these dampers operates independently or regardless of the extent of angular displacement of the flywheels 3 and 4 relative to each other.

The placing of the damper 14a radially outwardly of the damper 14b contributes still further to compactness and simplicity of the composite slip clutch 14 as well as of the entire torque transmitting mechanism.

The friction linings 37, 38 and 52, 53 constitute optional but desirable features of the improved mechanism. They ensure that one can select the friction between the flanges 33, 50 and the respective annular surfaces with a high degree of precision. The predictability of the action of dampers 14a, 14b can be enhanced still further if friction linings are provided not only adjacent the radially extending surfaces but also adjacent the axially extending surfaces of such flanges.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A mechanism for transmitting and for absorbing variations of torque, comprising a first flywheel which is rotatable relative to the engine and second flywheel which is rotatable relative to the first flywheel and is connectable to the input member of a change-speed transmission in a motor vehicle, and a plurality of dampers including three dampers arranged to operate between said flywheels one after the other, each of said dampers including at least one input element and at least one output element, one of the input and output elements of at least two of said dampers being rotatable relative to said flywheels and further comprising means for centering said rotatable elements relative to one of said flywheels, said rotatable elements being continuous ring-shaped.

2. The mechanism of claim 1, wherein one of said rotatable elements is the output element of one of said at least two dampers and the input element of a further damper of said at least three dampers.

3. The mechanism of claim 1, wherein said centering means comprises an axial protuberance of said one flywheel and a collar spacedly surrounding said protuberance and provided on said one flywheel, one of said rotatable elements being centered by said protuberance and the other of said rotatable elements being centered by said collar.

4. The mechanism of claim 3, wherein said one rotatable element has a central opening for said protuberance.

5. The mechanism of claim 3, wherein said collar has an internal surface surrounding said other rotary element.

6. The mechanism of claim 3, wherein said one rotatable element has an internal surface surrounding said opening and the periphery of said protuberance.

7. The mechanism of claim 3, further comprising a friction influencing lining between said protuberance and said one rotatable element.

8. The mechanism of claim 3, further comprising a friction influencing lining between said collar and said other rotatable element.

9. The mechanism of claim 3, wherein said protuberance has a friction influencing lining in contact with said one rotatable element.

10. The mechanism of claim 3, wherein said collar has a friction influencing lining in contact with said other rotatable element.

11. The mechanism of claim 3, wherein said one rotatable element has a friction influencing lining in contact with said protuberance.

12. The mechanism of claim 3, wherein said other rotatable element has a friction influencing lining in contact with said collar.

13. The mechanism of claim 3, further comprising a lining of hardened nickel between said one rotatable element and said protuberance.

14. The mechanism of claim 3, further comprising a lining of hardened nickel between said other rotatable element and said collar.

15. The mechanism of claim 3, further comprising a friction influencing lining between said one rotatable element and said protuberance, said lining containing polytetrafluoroethylene.

16. The mechanism of claim 3, further comprising a friction influencing lining between said other rotatable element and said collar, said lining containing polytetrafluoroethylene.

17. The mechanism of claim 3, further comprising antifriction bearing means surrounding said protuberance, said second flywheel being mounted on said bearing means and said first flywheel further having a substantially radial wall between said protuberance and said collar, said centering means including a surface provided on said protuberance axially between said bearing means and said wall, said one rotatable element surrounding said surface.

18. The mechanism of claim 3, wherein said rotatable elements comprise discs disposed in planes extending at right angles to the axis of said one flywheel, the plane of one of said discs being at least adjacent the plane of the other of said discs.

19. The mechanism of claim 1, wherein said centering means comprises means for centering said rotatable elements on said first flywheel.

20. The mechanism of claim 1, wherein one of said dampers includes an elastic damper and said dampers further comprise two frictional damping devices arranged to operate in series.

21. The mechanism of claim 20, wherein at least one of said frictional damping devices comprises at least one slip clutch.

22. The mechanism of claim 21, wherein one of said devices is disposed radially outwardly of the other of said devices.

23. The mechanism of claim 1, wherein said dampers include a first damper and a second damper, each of said first and second dampers having a pair of axially spaced-apart annular surfaces arranged to rotate with one of said flywheels, one surface of each pair being movable axially of the respective flywheel toward and away from the other surface of the respective pair and each of said first and second dampers further comprising at least one annular flange between the surfaces of the respective pair, said flanges being in frictional engagement with the surfaces of the respective pairs, one of said flanges constituting one of said rotatable elements and the other of said flanges constituting the other of said rotatable elements.

24. The mechanism of claim 23, one of said flanges surrounding the other of said flanges and said flanges being at least substantially coplanar.

25. The mechanism of claim 24, wherein said flanges are rotatable relative to each other and further comprising means for limiting the extent of angular movability of said flanges relative to each other.

26. The mechanism of claim 24, wherein each of said dampers is arranged to transmit between said flywheels torque within a predetermined range and said surrounding flange is rotatable relative to the surfaces of the respective pair through any desired angle when the magnitude of torque which is transmitted by the damper including said surrounding flange rises above the respective range.

27. The mechanism of claim 24, wherein said dampers further include an elastic third damper which operates between the surrounded flange and that flywheel which is rotatable relative to said annular surfaces.

28. The mechanism of claim 23, wherein at least one of said first and second dampers further comprises friction influencing linings between its annular surfaces and the respective flange.

29. The mechanism of claim 23, wherein each of said first and second dampers further comprises a pair of friction influencing linings between its annular surfaces and the respective flange, each lining of one of said pairs of linings being integral with one lining of the other pair of linings.

30. The mechanism of claim 29, wherein the linings of said one pair of linings and the linings which are integral therewith form two washers.

31. The mechanism of claim 30, wherein each of said washers has at least one aperture.

32. The mechanism of claim 30, wherein said washers are loosely installed between said flanges and the respective annular surfaces.

33. The mechanism of claim 32, wherein the flywheel which is rotatable with said annular surfaces has a collar with an internal surface which centers said washers.

34. The mechanism of claim 33, wherein said annular surfaces are rotatable with said first flywheel.

35. The mechanism of claim 23, one of said flanges surrounding the other of said flanges and having at least one radially inwardly extending projection, the surrounded flange having two radially outwardly extending projections flanking said radially inwardly extending projection with a predetermined play to allow for limited angular movements of said flanges relative to one another.

36. The mechanism of claim 23, wherein said centering means comprises an axial protuberance on said first flywheel and said flanges surround said protuberance, one of said flanges surrounding the other of said flanges and said dampers further comprising an elastic third damper operating between the surrounded flange and said second flywheel.

37. The mechanism of claim 1, wherein one of said dampers comprises an elastic damper having two coaxial discs arranged to rotate with one of said flywheels, one of said rotatable elements being disposed between said discs and said one rotatable element and said discs having registering windows, said elastic damper further comprising resilient energy storing means in said registering windows to yieldably oppose angular movements of said discs and said one rotatable element relative to each other.

38. The mechanism of claim 37, wherein the thickness of one of said disc deviates from the thickness of the other of said discs.

39. The mechanism of claim 38, wherein one of said discs is nearer to the flywheel which rotates with said discs than the other of said discs and said nearer disc is thinner than the other of said discs.

40. The mechanism of claim 38, wherein the ratio of thicknesses of said discs is between 1:1.5 and 1:3.

41. The mechanism of claim 37, wherein said elastic damper further comprises means for limiting the angular movability of said one rotatable element relative to said discs, said one rotatable element having at least one circumferentially extending opening and said limiting means comprising a fastener connecting said discs with one another and with one of said flywheels and extending with clearance through said opening.

42. The mechanism of claim 41, wherein said opening is an elongated slot and said fastener includes a rivet-like member which is anchored on one of said flywheels and is arranged to maintain said discs at a fixed axial distance from one another.

* * * * *